United States Patent [19]
Finkelstein et al.

[11] Patent Number: 5,420,834
[45] Date of Patent: May 30, 1995

[54] OPTICAL DISK RECORDERS USING DISKS COATINGS CLOSE TO OUTER SURFACES WITH OPTICAL PATH EXTENDING THROUGH A THICK TRANSPARENT SUBSTRATE

[75] Inventors: Blair I. Finkelstein; Andrew A. Gaudet, both of Tucson, Ariz.; Terry W. McDaniel, Morgan Hill, Calif.; Hal J. Rosen, Los Gatos, Calif.; Kurt A. Rubin, Santa Clara, Calif.; Timothy C. Strand, San Jose, Calif.

[73] Assignee: International Business Machines Corporation, Armonk, N.Y.

[21] Appl. No.: 248,045

[22] Filed: May 24, 1994

Related U.S. Application Data

[62] Division of Ser. No. 999,751, Dec. 31, 1992.

[51] Int. Cl.⁶ .................. G11B 17/32; G11B 7/26
[52] U.S. Cl. .................... 369/13; 369/275.2; 369/14
[58] Field of Search ............ 369/13, 14, 15, 32, 369/272, 275.1, 275.2, 275.4, 275.5

[56] References Cited

U.S. PATENT DOCUMENTS

| | | | |
|---|---|---|---|
| 4,737,947 | 4/1988 | Osato et al. | 369/13 |
| 4,740,947 | 4/1988 | Ohta et al. | 369/284 |
| 4,807,204 | 2/1989 | Mizutani et al. | 369/13 |
| 5,202,880 | 4/1993 | Lee et al. | 369/275.4 |

Primary Examiner—Georgia Y. Epps
Assistant Examiner—Tan Dinh
Attorney, Agent, or Firm—H. F. Somermeyer

[57] ABSTRACT

A magnetooptical disk has two axially space-apart translucent recording layers. Each translucent recording layer is axially closer to an outer surface of the disk than to the other recording layer. This geometry enables closely axially disposing a magnetic field biasing means to each of the recording layers from opposite axial sides of the disk, respectively. Laser beams are axially introduced into the disk to pass through one of the translucent recording layers in a defocussed state to reach a second recording layer in a focussed state. In this manner, recording in the second layer is effected by a modulated magnetic bias field using a constant intensity laser beam. Two sets of laser beams and magnetic biasing means are provided for recording on both data in both of the recording layers.

14 Claims, 2 Drawing Sheets

OPTICAL DISK RECORDERS USING DISKS COATINGS CLOSE TO OUTER SURFACES WITH OPTICAL PATH EXTENDING THROUGH A THICK TRANSPARENT SUBSTRATE

This application is a division of Ser. No. 07/999,751, filed Dec. 31, 1992.

FIELD OF THE INVENTION

The present invention relates to optical recorders and players that employ a double-sided optical disk in which the recording layers are disposed immediately axially adjacent respective outer surfaces of an optical disk. The invention relates to all types of optical media, such as read only media (ROM), write-once media (WORM), photochromic, phase-change media and magnetooptical (MO) media.

BACKGROUND OF THE INVENTION

It is desired that optical media players operate with plural types of optical media. As a corollary, it is desired that construction of optical media enable supporting diverse optical recording layers in a manner for enhancing optical writing and reading operations while increasing total storage capacity.

It is also desired in magnetooptical disk data storage systems to provide the so-called direct overwrite. That is, rather than the current practice of requiring an erasure of a magnetooptical data storing area before writing or recording in such area, it is desired to provide for direct overwriting any currently stored data in a magnetooptical data storage system, whether single-sided or double-sided media are used.

Several direct overwrite methods are known. On such method for direct overwriting included modulating the bias magnetic field while keeping the laser writing beam at a constant write intensity rather than the current practice of modulating the intensity of the laser writing beam while holding the magnetic field direction constant. A second known method of direct overwrite in MO media is to modulate the laser beam for writing combined with a pair of magnetic bias coils, one coil for writing and one for erasing MO media. Other methods of direct overwrite, some of such methods include particular media constructions termed a "media solution", have been proposed. Such additional methods are not described here.

One of the problems with obtaining such direct overwriting in MO media is that the magnetic field source is disposed a relatively long distance from the magnetooptical recording layer. This spacing not only requires what is considered as excessive magnetic power, but also the cross-section of the magnetic field has a greater dimension than desired for high density recording. To solve these problems, the source of the magnetic bias field must be as close as possible to the magnetooptical recording layer and the laser beam must be accurately focussed at the magnetooptical recording layer.

It is particularly useful to increase the current data storage capacity of smaller diameter optical disks, such as the 90 mm diameter optical disks. Doubling the data-storage capacity of these small diameter small disks provide a cost effective compact data storage unit. For enabling compatibility with current day 90 mm optical disk players, the disk construction for doubling the capacity of each disk should not increase the axial dimension of the disk. Such media construction should also accommodate all types of optical recording layers.

DISCUSSION OF THE PRIOR ART

Published European patent application EP 411,783 A by T. Wananabe teaches that both the magnetic bias assembly and the objective lens should be on the same side of the disk for double sided recording. That is, one magnetic bias assembly and its associated objective lens for a laser beam are on one side of the disk for recording and reading on that one side while a second such magnetic assembly and objective lens are on the opposite side for recording and reading on the second side of the disk. In contrast, the present invention uses a laser beam entering one surface of a disk while the magnetic bias field is imposed via an oppositely facing disk surface to the one surface. It is believed that the arrangement of the invention has advantages over the prior art wherein the bias field and the laser beam enter the disk through the same surface.

The Mizutani et al U.S. Pat. No. 4,807,204 in its FIG. 8 shows an optical disk recorder/player for two sided disks in which the magnetic bias assembly and the objective lens are in a unitary assembly, one assembly for each side of the disk. Therefore, Mizutani et al teach the same general arrangement as Wananabe teaches that is contrary to the teachings and claims of the present invention.

Osato et al in U.S. Pat. No. 4,737,947 show a two sided optical disk having a reflective layer axially optically isolating the sides of the disk such that neither the laser beam nor the magnetic field entering the disk from one side will not extend over to the other side.

Tanaka in U.S. Pat. No. 4,617,601 shows a two-sided magnetooptical disk in which each magnetooptical layer is recorded upon by a laser beam entering the disk from a closest surface axially closest to the objective lens passing the laser beam. In contrast, the disk of the present invention provides for the laser beam for each of the magnetooptical layers to enter the disk from a more remote surface rather than a closest disk surface and that a magnetic bias field enters the disk through the closest disk surface to the respective magnetooptical layers.

Lee et al U.S. Pat. No. 5,202,880 show a recording layer disposed closely to an outer surface of an optical disk that must be accessed ONLY through their outer thin protective layer and NOT through a support substrate. That is, the Lee et al protective coating 150 (FIG. 3) of 400+ Angstrom units (40+ micrometers) is the only separation of the recording layer and the outside air. This fact means that any surface defect/dust has a significant negative effect on recording and reading, i.e. the laser beam is almost in focus enabling a microscopic defect to block a significant part of the beam from the recording layer. This type of recording layer accessing is often termed "air incident" optical recording. In particular, the OPAQUE reflective layers 120 (FIG. 3 of Lee et al) ensure that the only access to the respective recording layers 140 is through the respective 40+ micrometer protective 150. In contrast applicants' invention requires that the optical path to the recording layer include the central or core substrate.

SUMMARY OF THE INVENTION

It is an object of the present invention to provide a two-sided optical disks having diverse optical recording layers that are axially spaced-apart and disposed immediately axially adjacent respective outer disk surfaces. In magnetooptical disks, such arrangement also provides for direct overwriting of two-sided optical disks wherein magnetic field power dissipation is minimized.

In accordance with one aspect of the invention., a two-sided optical disk has two translucent recording layers disposed relatively axially close to respective faces or planar surfaces of the disk. The interior of the disk, preferably a single substrate, is transparent so that a laser beam entering the disk from a first face or planar surface may readily penetrate the disk to a more axially remote optical recording layer disposed adjacent an oppositely facing planar radially-extending surface of the disk. The optical recording layers are preferably selected from the group of recording layers comprising read-only metallic, write-once read-many (metallic, phase-change, bubble, ablative, photochromic, and the like), rewriteable (phase change, magnetooptical, photochromic and the like) or a mixture of the members of the group.

In optical magnetic media, such as MO media, to enable a magnetic bias field source to be disposed closely to either of the recording layers, the recording layers are disposed axially in the disk closely to respective ones of the outer axial or radially extending surfaces of the disk.

In accordance with another aspect of the invention, a recorder/player (herein also termed a device) has either one or two objective lenses that focus a beam on a more axially remote recording layer for recording data. The beam is defocussed at the more axially close recording layer. In a two-lens embodiment, the lenses respectively face two planar oppositely facing disk surfaces. In a magnetooptical variant of this aspect, a magnetic bias field source is disposed facing the respective lenses and disposed in close proximity to the axial side of the disk opposite side the lens. The magnetooptical layer closest to the respective magnetic bias field source is recorded in the recording layer by the respective laser beam penetrating the disk to such recording layer.

The foregoing and other objects, features and advantages of the invention will be apparent from the following more particular description of preferred embodiments of the invention, as illustrated in the accompanying drawings.

DETAILED DESCRIPTION

Figure 1:
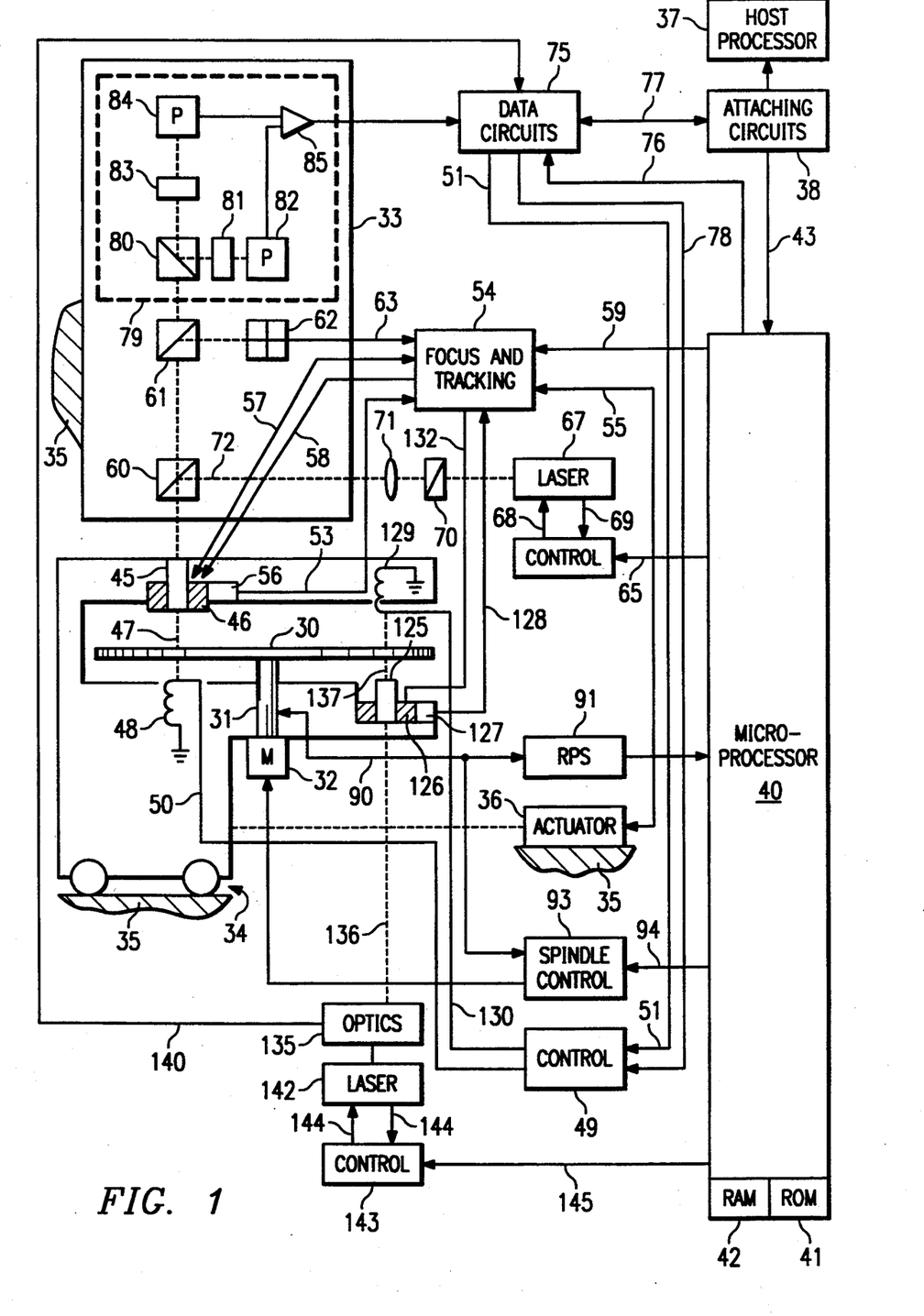
FIG. 1 illustrates a magneto optical disk device constructed using the present invention.
Figure 2:
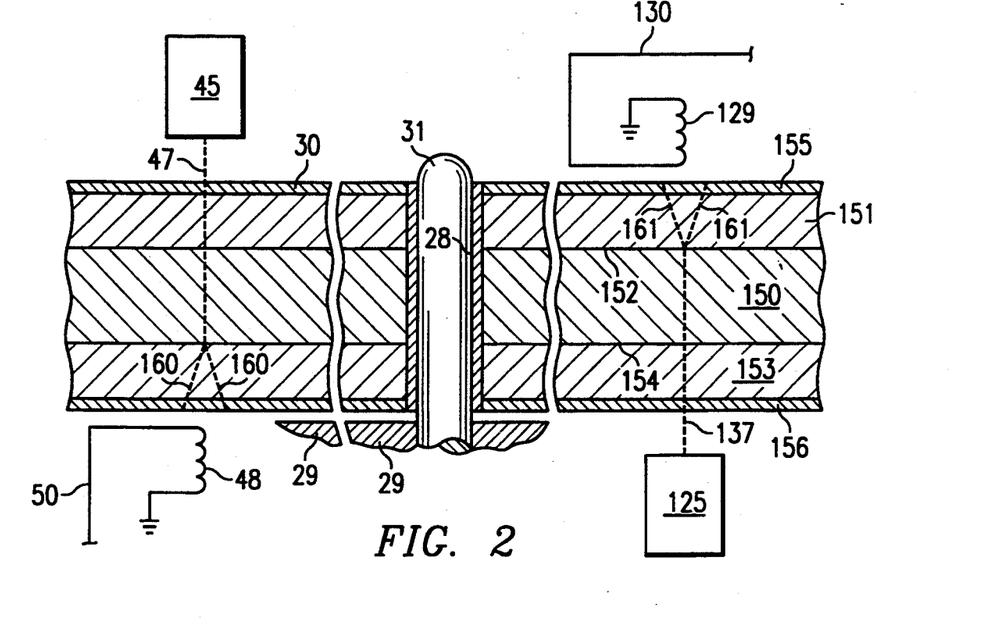
FIG. 2 illustrates a magnetooptical disk usable in the FIG. 1 illustrated device for practicing the present invention and the disk is constructed in accordance with the present invention.

Referring now more particularly to the appended drawing, like numerals indicate like parts and structural features in the various figures. Referring first to FIG. 1, a magnetooptical device that employs the present invention is described. Magnetooptic record disk 30 (best seen in FIG. 2) is removably mounted for rotation on spindle 31 by motor 32. Since most optical disk drives removeably receive optical disks using disk cartridge receivers or holders, FIG. 2 illustrates small diameter platter 29 coaxially disposed on spindle 31 for precisely receiving disk 30 by its hub 28. Any usual disk or disk-cartridge handling mechanism may be employed for loading and unloading disk 30 unto and from the FIG. 1 illustrated optical disk drive.Optical portion 33 is mounted on frame 35 of the device. A headarm carriage 34 moves radially of disk 30 for carrying an objective lens 45 from track to track. The radial motions of carriage 34 enable access to any one of a plurality of concentric tracks or circumvolutions of a spiral track for recording and recovering data on and from the disk. Linear actuator 36 suitably mounted on frame 35, radially moves carriage 34. The illustrated device is suitably attached to one or more host processors 37, such host processors may be control units, personal computers, large system computers, communication systems, image signal processors, and the like. Attaching circuits 38 provide the logical and electrical connections between the optical device and the attaching host processors 37.

Microprocessor 40 controls the device including the attachment to the host processor 37. Control data, status data, commands and the like are exchanged between attaching circuits 38 and microprocessor 40 via bidirectional bus 43. Included in microprocessor 40 is a program- or microcode-storing, read-only memory (ROM) 41 and a data and control signal storing random-access memory (RAM) 42.

While the invention is advantageously practiced with optical disk devices that have one optical means (that is, only one side of the disk may be read while the disk is received into the device), the illustrated embodiment illustrates the use of two separate and independent optical means 33 and 135 in the device. Many optical disk devices currently use only one optical system for operating with so-called single-sided disks (one recording layer). Currently, most optical disk drives designed to operate with 90 millimeter diameter optical disks use only single-sided optical disks. Using the invented two-sided disks in these single-sided devices greatly reduces the number of optical disks required.

The illustrated two independent optical means afford an enhanced version usage for the FIG. 2 illustrated optical disk. When using the FIG. 2 illustrated two-sided disk in an optical disk device having a single optics, the two-sided disk is inserted into the optical disk drive with either of the two sides facing the single optical system. Reversing the orientation of the two-sided disk provides access to both recording layers in the disk.

In FIG. 1, first optics 33 is shown in detail, second optics 135 is constructed identically to first optics 33. In first optics 33, a first objective or focusing lens 45 is optically coupled to first optics 33 and is mounted for focusing and radial tracking motions on carriage 34 by fine actuator 46. This actuator includes mechanisms for moving lens 45 toward and away from disk 30 for focusing and for moving lens 45 radially of disk 30 for tracking and seeking. Fine actuator 46 may shift the laser beam over a radial range of 100 tracks so that carriage 34 need not be actuated each time a track adjacent to a track currently being accessed is to be accessed. Numeral 47 denotes a two-way light path between lens 45 and the first face or recording surface of disk 30. Second objective lens 125 is mounted for relative movements by actuator 126 in the same manner that actuator 46 mounts and moves objective lens 45. Objective lens 125 supplies a laser beam to and receives a reflected laser beam from a second face or surface of disk 30 over light path 137. Magnetooptic recording or data-storing layers 152 and 154 (FIG. 2) are axially closely disposed to the respective radial surfaces of disk 30.

In magnetooptic recording, a magnetic bias field directs the magnetization of the respective recording spot of the recording surfaces to one of two magnetic polarities. Magnetic coils 48 and 129 respectively provide magnetic bias fields to the second and first recording layers 151 and 153 of two-sided disk 30 and respectively cooperate with the objective lens 45 and 125 for recording data in recording layers 151 and 153 of disk 30, as will become more apparent.

In a constructed embodiment, each coil 48 or 129 provides a weak magnetic bias field for directing the remnant magnetization direction of a small spot on disk 30 illuminated by laser light from lens 45 or 125, respectively. The laser light spot heats the illuminated spot on the record disk to a temperature above the Curie point of a magnetooptic layer 152 or 154, each comprising an alloy of rare earth and transitional metals as taught by Chaudhari et al., U.S. Pat. No. 3,949,387. This heating enables magnet coil 48 or 129 generated magnetic bias field to direct the remanent magnetization to a desired direction of magnetization as the spot cools below the Curie point temperature. Magnet coil 48 or 129 supplies a bias field oriented in either the "write" direction, i.e., binary ones recorded on disk 30 normally are "north pole remnant magnetization" or in an "erase" direction to record a binary 0. In direct overwriting, data circuits 75 actuate control 49 respectively over lines 50 and 130 to the respective coils 48 and 129 to modulate the magnetic bias fields for recording data on the respective recording layers in disk 30, as best seen in FIG. 2. To completely erase a portion of disk 30, magnet coil 48 or 125 supplies a constant binary "0" magnetic field so the south pole is continuously adjacent in the area of disk 30 being erased.

It is also necessary to control the radial position of the beams traveling over paths 47 and 137 such that a track or circumvolution of a spiral optical track is faithfully followed and that a desired track or circumvolution is quickly and precisely accessed. To this end, focus and tracking circuits 54 control coarse actuator 36 and both fine actuators 46 and 126. The positioning of carriage 34 by actuator 36 is precisely controlled by control signals supplied by circuits 54 over line 55 to actuator 36 to follow the motions of actuator 46. Actuator 126 and objective lens 125 are mounted on carriage 34 such that the laser beam focused by lens 125 can scan tracks one recording layer 152 while the objective lens supplied laser beam scans a track on either recording layer 151 or 153. Fine actuators 46 and 125 perform track following and seeking under control of circuits 54 exercised through control signals travelling to fine actuator 46 over line 58 and to actuator 126 over a line in three line cable 132.

RPE sensor 56 senses the relative position of fine actuator 46 to headarm carriage 34 to supply a relative position error (RPE) signal on line 53. Similarly, RPE sensor 127 senses the relative position of actuator 126 to carriage 34 to supply second RPE signal over line 128 to focus and tracking circuits 54. As RPE sensor 56 supplied signal is preferably used to control movement of carriage 34 via coarse actuator 36, the second RPE signal on line 128 is a back up to the first RPE signal. Of course, second RPE sensor 127 may be dispensed with. Focus control for actuator 46 is achieved via two conductors in cable 57. One conductor carries a focus error signal to circuits 54 and a second conductor carries a focus control signal from circuits 54. Control of fine actuator 126 focus motions is identically effected by two conductors in three conductor or line cable 132.

The focus and tracking position sensing is achieved by analyzing laser light reflected from disk 30 over path 47, thence through lens 45, then in optics 33,through one-half mirror 60 and to be reflected by half-mirror 61 to a so-called "quad detector" 62. Quad detector 62 has four photoelements which respectively supply signals on four lines collectively denominated by numeral 63 to focus and tracking circuits 54. Aligning one axis of the detector 62 with a track center line, track following operations are enabled. Focusing operations are achieved by comparing the light intensities detected by the four photoelements in the quad detector 62. Focus and tracking circuits 54 analyze the signals on lines 63 to control both focus and tracking. In an identical manner, optics 135 have the elements described for optics 33 to process reflected laser beam over path 137 through objective lens 135, thence over light path 136 to optics 135.

Recording or writing data onto disk 30 is next generally described. More details on recording are found in the description of FIGS. 2–4. It is assumed that to record data on second recording layer 154 (FIG. 2), coil 48 supplies a modulated bias field to a desired recording area in a track for recording data. Laser 67 supplies a constant intensity recording beam through optics 33 and lens 45 that is focussed on second recording layer 154 (FIG. 2). Microprocessor 40 supplies a control signal over line 65 to laser control 66 for indicating that a recording operation is to ensue. This means that laser 67 is energized by control 66 to emit a high-intensity laser light beam for recording; in contrast, for reading, the laser 67 emitted laser light beam is a reduced intensity for not heating the laser illuminated spot on layer 154 of disk 30 above the Curie point. Control 66 supplies its control signal over line 68 to laser 67 and receives a feedback signal over line 69 indicating the laser 67 emitted light intensity. Control 68 automatically controls the light intensity to the desired value. In this regard, data circuits 75 (later described) supply data indicating signals over line 78 to control 49 for effecting modulation of the coil 48 supplied magnetic bias field. Such data-indicating signals have first been encoded by data circuits 75 into a recording code, such as a known d,k code, an Modified Frequency Modulated (MFM) code and the like. Data circuits 75 are prepared for recording by the microprocessor 40 supplying suitable control signals over line 78. Microprocessor 40 in preparing circuits 75 is responding to commands for recording received from a host processor 37 via attaching circuits 38. Once data circuits 75 are prepared, data is transferred directly between host processor 37 and data circuits 75 through attaching circuits 38. Data circuits 75, also have ancillary circuits (not shown), relating to disk 30 format signals, error detection and correction and the like. Circuits 75, during a read or recovery action, strip the ancillary signals from the readback signals before supply corrected data signals over bus 77 to host processor 37 via attaching to circuits 38.

In a substantially identical manner, data are recorded on the first side recording layer 152 (FIG. 2) by modulating the magnetic bias field 161 supplied by coil 129. Coil 129 signal power is modulated by signals travelling over line 130 from control 49. Data circuits 75 supply the data and other signals to be recorded over line 51 to control 49. Laser 142 is actuated via laser control 143 and lines 144 by microprocessor 40 to emit a recording or writing intensity laser beam over light path 136 through lens 126. Lens 136 focusses the laser beam travelling over path 136 onto first recording layer 152.

Reading or recovering data from disk 30 for transmission to a host processor requires optical and electrical processing of the laser light beam reflected from the disk 30. That portion of the reflected light traveling through objective lens 45 has its linear polarization from polarizer 70 rotated by disk 30 recording using the Kerr effect) travels along the two-way light path 47, through lens 45 and half-mirrors 60 and 61 to the data detection portion 79 of the headarm 33 optics. Half-mirror or beam splitter 80 divides the reflected beam into two equal intensity beams both having the same reflected rotated linear polarization. The half-mirror 80 reflected light travels through polarizer 81 while the transmitted light travels through half-mirror 80 to polarizer 83. Polarizers 81 and 82 respectively pass light at 0° and 90°. The reflected light is polarized at 45° and respectively rotated positive and negative directions from the 45° to indicate the sensed remanent magnetization as being "south" or "north". Photocells 82 and 84 respectively receive light from polarizers 81 and 83 for supplying electrical signals to differential amplifier 85. Amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

Optics 135 detect data read from either layer 151 or 153 (as later described in more detail) to supply signals over line 140 to data circuits 75 in the same manner that optics and circuits 79 supply detected data signals to data circuits 75.

The rotational position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal-controlled oscillator for controlling motor 32 speed, as is well known. Microprocessor 40 supplies control signals over line 94 to control 93 in the usual manner.

From all of the above and as best seen in FIG. 2, in a two optical system device either lens 45 or 125 pass a laser beam for reading data from either of the recording layers 151 and 153 (FIG. 2). Regardless of the type of recording layers present in disk 30, data recording for first recording layer 151 is effected by laser 135 supplied light beam focused on layer 151. Recording layer 153 is translucent to pass the path 137 laser beam, de-focussed at recording layer 153 without substantially heating. Similarly, data are recorded on second recording layer 153 by the laser 67 supplied laser beam focused on layer 153. Since the laser 67 supplied laser beam is not focussed as the beam passes through first recording layer 151, there is insubstantial heating in layer 151.

In a single optical device only lens 45, its support and associated optics are present in the drive. Recording on both of the recording layers 151 and 153 requires removing the disk 30, turning it over and re-inserting the disk into the FIG. 1 illustrated drive.

All of the above described operations are possible because of the construction of disk 30 (FIG. 2). First of all, the two axially spaced-apart magnetooptical recording layers 151 and 153 each consist of a layer of magnetooptical material, such as TbFeCo, that has a transmissibility of at least about 30%, i.e. are translucent. The recording layer axial thickness is preferably not greater than about 200 Angstrom units. For controlling the number of voids in a recording layer, a minimal thickness of about 100 Angstrom units is desired, no limitation thereto intended. Inner annular core or substrate 150 may be either glass or a suitable polycarbonate, and the like. The preferred axial thickness of substrate 150 is not less than one millimeter, for example 1.2 millimeters. A spiral track forming groove(not shown) is disposed in annular core 150 on which recording layers 151 and 153 are deposited. Numerals 152 and 154 respectively indicate the axially inward floor of such grooves. The track indicating groove(s) has a radial width of about one micron with about one micron radial mesa area between radially adjacent circumvolutions of the spiral. Protective coatings 155 and 156 can be sputtered or otherwise vapor deposited in a spin-coating process to a thickness of about one to fifty microns, for example. Coatings 155-156 can enclose the entire disk to form one continuous coating. This ultra-thin protective layer places the recording layer immediately axially adjacent (i.e. microns) the outer surface of the disk. Such protective coating(s) form a sealed envelope of relatively inert transparent moisture-impermeable dielectric material, such as silicon nitride. The protective coating provides dust protection, scratch resistance and anti-static properties to the disk. The recording layers 151 and 153 also can be in separate sealed dielectric envelopes.

In one test of a translucent recording layer, the magnetooptical material had a thickness of about 100 Angstrom units while the protective dielectric envelope had a coating thickness of 1200 Angstrom units, the trilayer test sandwich having a thickness of 2500 Angstrom units. The trilayer sandwich was supported on a glass substrate. The transmissibility of the trilayer test sandwich was measured to be 40%.

In the illustrated embodiment, the thickness of core or substrate 150 is always substantially greater than the depth of field of the beam, hence if the beam is in focus on one surface 152 it is out of focus on a second surface 154. The axially thickness of substrate 150 axially separates the recording layers 151 and 153 such that any beam focussed on one recording layer is defocussed at the other recording layer. It has been found that one millimeter axial thickness is sufficient for avoiding optical interference between the laser beam and a recording layer not intended to be read or written to. The one millimeter axially thick disk has been found to provide reasonable stiffness for handling in an optical device. Also, because,in the illustrated embodiment, the protective coating is not greater than fifty microns, the outer axial surface of the disk is close to the focal plane such that defocus of the beam at the axial surface is not sufficient to avoid effects of outer surface perturbations (dust, etc) on recording and reading.

The write intensity laser beams in paths 47 and 137 are focussed respectively on their far or axially remote recording layers 151 and 153. The path 47 beam is therefore not in focus as the beam penetrates translucent recording layer 151 on its way to far recording layer 153. Similarly, the laser beam on path 137 focussed on its far recording layer 151 is defocussed as it passes through its near recording layer 153. Therefore, neither of the laser beams will provide substantial heating of their respective near recording layers. The partial beam reflection from the near layers is diffuse such that only a small portion thereof enters the objective lenses 45 and 125, respectively.

Since the dielectric coatings 155 and 156 preferably have an axial thickness not greater than fifty microns, coils 48 and 129 can be axially closely disposed to recording layers 154 and 152, respectively. Comparing this novel arrangement with current prior art optical disks, the outer coatings of prior art optical disks have a thickness measured in the millimeter range rather than fifty microns. This great difference in thickness makes the fifty micron thick coating thickness appear negligible with the prior art. Therefore, in new disk 30, the bias magnetic fields effectively control the recording process with a substantially reduced power dissipation as compared with current day optical disks. The reduced power requirements of the new disk enable faster magnetic bias modulation rates for a given input electrical power and coil inductance. Not shown, but advantageously useful are known field focussing units may be incorporated with coils 48 and 129 for increasing efficiency of the bias magnetic fields.

It is also to be appreciated that the present day recording method of a constant bias magnetic field cooperating with an intensity modulated laser beam may record data on either of the layers either using only the layer axially closest to the laser beam source or using either the axially close or far recording layer. Because the near outer surface of the disk is axially close to the near recording layer (the outer surface of coating 155 is microns away from recording layer 151, for example), the outer surface is near the focal plane of the recording. Therefore, any surface perturbations (dust, scratches, etc) have a significant negative effect on the recording. Recording on the near layer requires that the near surface be exceptionally free of perturbations, such as dust, scratches and the like. Accordingly, it is highly preferred that recording only occur at the far or remote recording layer.

One or both of the illustrated and described magnetooptical recording layers 151 and 153 may in part or in total be replaced by translucent read only layers. Such read only layers may be constructed by vapor depositing thin translucent metallic films for layers 151 and/or 153. Write-once or read-only recording layers (such as metallic layers), phase-change recording layers, photo-chromic layers and the like can be substituted for one or both of the illustrated MO recording layers. New disk 30 can have one recording layer of phase-change materials and a second recording layer of read-only materials, be a two-sided ROM or WORM disk, be a combined MO, WORM and ROM (WORM and ROM could be in the same recording layer or share a recording layer with the MO portion or any combination of diverse recording layer materials. Other combinations of recording layer characteristics may also be employed.

New disk 30 is usable with any current optical disk drive that receives its physical configuration and is operable with recording layers in each such new disk. That is, a current optical disk device can be used to record on the far recording layer.

Figure 3:
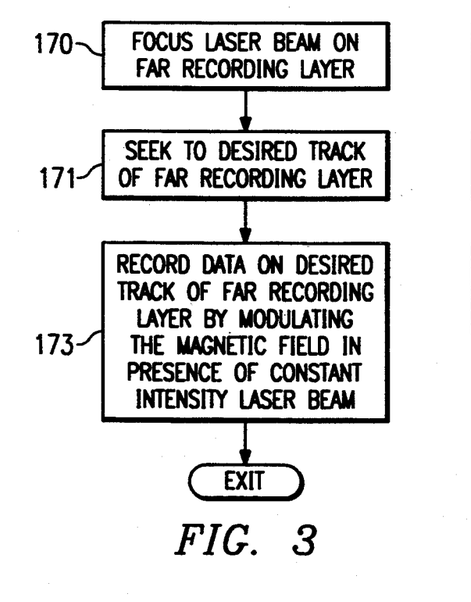
FIGS. 3 and 4 are flow charts illustrating operations of the FIG. 1 illustrated device while using the present invention.

FIG. 3 is a generalized flow chart showing a sequence of operations to record data on a far recording layer, such as layer 154 for laser 67 having its beam being focussed by objective lens 45. Step 170 focusses the laser beam on the axially far recording layer. Step 171 moves the laser beam (seek) to a desired circumvolution of the spiral track. Then step 173 records data on the far layer (153 for laser 67 and lens 45 or layer 151 for laser 125). Of course, during a second rotation of disk 30, the optical system including lens 45 may read the recorded data through translucent layer 152.

Figure 4:
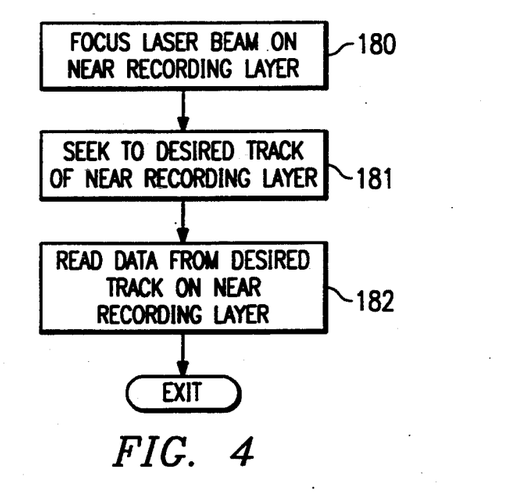

FIG. 4 illustrates reading data by a beam passing through an objective lens that was just used to record data on a respective axially far layer. Step 180 focusses the objective lens (45 or 125) to its axially near recording layer. Step 181 seeks the beam to a desired circumvolution in the axially far recording layer. Step 182 reads data stored in the axially near recording layer. In all of the example operations, it is to be borne in mind that the time required to refocus the objective lenses adversely affects device performance. Accordingly, access procedures are used (not described) that minimize refocussing the lenses particularly in those devices having a high effective data rate requirement.

While the invention has been particularly shown and described with reference to preferred embodiments thereof, it will be understood by those skilled in the art that various changes in form and details may be made therein without departing from the spirit and scope of the invention.

What is claimed is:

1. An optical disk recording/playing device having means for rotatably supporting an optical disk in a play position, the improvement including, in combination:

the optical disk having a transparent annular planar substrate having a predetermined axial dimension and first and second oppositely facing surfaces;

first and second axially spaced-apart translucent annular planar optically responsive recording layers respectively on said first and second oppositely facing surfaces;

first and second transparent coatings respectively disposed on and covering said first and second recording layers, said first and second transparent coatings having respective axial thicknesses of an order of magnitude thinner than said predetermined axial dimension, said first and second transparent coatings respectively having first and second outwardly facing annular surfaces such that the axial spacing between said first and second recording layers is greater than the axial spacings respectively between said first and second annular surfaces and said first and second recording layers;

first optical means in the device having means for supplying a laser beam to be focussed on said second recording layer through said first annular surface along a first predetermined axial path including a portion of the path being in said substrate such that said laser beam is in focus on said second recording layer and passing through the first coating and said first recording layer in a defocussed state; and first magnetic bias field means in the device disposed axially adjacent said second annular surface of the disk and being circumferentially aligned with said first predetermined path for supplying a bias magnetic field to said second recording layer simultaneously with said first optical means supplying said laser beam focussed on said second recording layer whereby signals are recorded on said second recording layer using a constant laser beam intensity and a signal-modulated magnetic field.

2. The device set forth in claim 1, further including, in combination:

second optical means in the device having means for supplying a laser beam via an objective lens in a defocussed state through said second annular surface along a second predetermined axial path for focussing said laser beam on said first recording layer, said second predetermined axial path including a portion in said transparent substrate, said second axial path being circumferentially displaced from said first axial path;

second magnetic bias field means in the device disposed axially adjacent said first annular surface of the disk and being circumferentially aligned with said second predetermined path for supplying a bias magnetic field to said first recording layer; and control means connected to said first optical means and to said first magnetic bias field means for simultaneously actuating said first optical means and said first magnetic bias field means for recording data on said second recording layer and being connected to said second optical means and to second magnetic bias field means for simultaneously actuating said second optical means and said second magnetic bias field means for recording data on said first recording layer.

3. The device set forth in claim 2, further including, in combination:

said first and second recording layers including a predetermined portion consisting of a selected one from a group of recording layer portions comprising a read-only recording layer portion, a phase-change recording layer portion, a photochromic recording layer portion, a magnetooptical recording layer portion or a write-once recording layer portion.

4. The device set forth in claim 2, further including, in combination:

said control means having data means connected to said first and second magnetic bias field means for supplying data indicating signals to said first and second magnetic bias field means for respectively modulating magnetic bias fields respectively supplied by said first and second magnetic bias field means to said second and first recording layers.

5. The device set forth in claim 1, further including, in combination:

said recording layers including a recording layer having a predetermined portion selected from a group of recording layer portions comprising a read-only recording layer portion, a photochromic recording layer portion, a phase-change recording layer portion, a photochromic recording layer portion, a magnetooptical recording layer portion or a write-once recording layer portion.

6. The device set forth in claim 1, further including, in combination;

each said translucent recording layers having an axial thickness of not greater than 200 Angstrom units. magnetooptical material having an axial thickness of not greater than about 200 Angstrom units.

7. In a method of recording data signals on a recording layer of an optical disk having first and second axially spaced-apart optically-translucent recording layers respectively disposed axially immediately adjacent first and second surfaces of the disk, a transparent substrate axially interposed between said recording layers for supporting said recording layers in an axially spaced-apart relationship; including steps of: shining a first laser beam along a predetermined axially extending path into the optical disk through the first surface of the disk for first axially traversing said first recording layer in a defocussed state for not heating the first layer axial traversed to a temperature at which recording occurs, then impinging said first laser beam, via said transparent substrate, on said second recording layer in a focussed state for heating the point of impingement of said laser beam on the second recording layer to a temperature at which recording occurs in said second recording layer.

8. The method set forth in claim 7, further including the steps of:

supplying a second laser beam circumferentially displaced from said first laser beam, axially through said second annular surface in a defocussed state to impinge on said first recording layer, after passing through said transparent substrate, in a focussed state for recording predetermined data on said first recording layer.

9. The method set forth in claim 8, further including the steps of:

selecting said recording layer to include a recording layer portion selected from a group of recording layer portions comprising a read-only recording layer portion, a photochromic recording layer portion, a phase-change recording layer portion, a photochromic recording layer portion, a magnetooptical recording layer portion or a write-once recording layer portion.

10. The method set forth in claim 7, further including the steps of:

selecting at least a portion of one of said recording layers to consist of magnetooptical material; and magnetically axially imposing a bias magnetic field on said portion through said outer surface of the disk axially closest to the portion to be coincident with impingement of said focussed laser beam on said portion for magnetooptically recording data signals in said portion.

11. The method of recording data into an optical disk having a transparent annular substrate having first and second outwardly facing annular surfaces and having a predetermined axial thickness sufficient for enabling a defocussed laser beam entering one of said surfaces to be in a focussed state at an opposite one of said surfaces, an annular magnetooptical recording layer disposed on said second annular surface, a coating disposed on said recording layer having a thickness an order of magnitude less than the axial thickness of said transparent substrate; including steps of:

shining a laser beam axially into said optical disk passing first through said first surface in a defocussed state and reaching said recording layer in a focussed state; and simultaneously to shining said laser beam, imposing a magnetic bias field through said coating and circumferentially aligned with said laser beam onto said recording layer including modulating the imposed magnetic bias field for recording data in said recording layer.

12. In the method set forth in claim 11, including a step of:
selecting said recording layer to comprise magnetooptical material having an axial thickness of not greater than about 200 Angstrom units.

13. In the method set forth in claim 11, including a step of:
selecting said coating to have an axial thickness of about 1200 Angstrom units.

14. In the apparatus set forth in claim 1, further including, in combination:
said first and second transparent coatings each having an axial thickness of about 1200 Angstrom units.

* * * * *

UNITED STATES PATENT AND TRADEMARK OFFICE
CERTIFICATE OF CORRECTION

PATENT NO. : 5,420,834
DATED : May 30, 1995
INVENTOR(S) : Finkelstein, Gaudet, McDaniel, Rosen, Rubin and Strand It is certified that error appears in the above-indentified patent and that said Letters Patent is hereby corrected as shown below:

TITLE PAGE, ITEM [56]:
    Under References Cited, Foreign Documents, the following needs to be added:
-- 2,017,379  10/79  GBA
   424,809   5/91  EPA
   517,490  12/92  EPA --.

At column 6, line 26, insert -- 160 -- after "field"

At column 8, line 26, delete "the axially inward floor of".

At column 12, delete lines 5 and 6.

Signed and Sealed this

Twenty-first Day of November, 1995

*Attest:*

BRUCE LEHMAN

*Attesting Officer*     *Commissioner of Patents and Trademarks*